United States Patent
Hawkins et al.

(10) Patent No.: US 9,630,719 B2
(45) Date of Patent: *Apr. 25, 2017

(54) SPACE EFFICIENT LAVATORY MODULE FOR COMMERCIAL AIRCRAFT

(71) Applicant: B/E Aerospace, Inc., Wellington, FL (US)

(72) Inventors: Aaron Hawkins, Mercer Island, WA (US); Robert K. Brauer, Seattle, WA (US); Ed Kinnier, III, Winston-Salem, NC (US); Christopher I. Pirie, Mukilteo, WA (US)

(73) Assignee: B/E Aerospace, Inc., Wellington, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/717,945

(22) Filed: May 20, 2015

(65) Prior Publication Data

US 2015/0251760 A1    Sep. 10, 2015

Related U.S. Application Data

(60) Division of application No. 13/551,397, filed on Jul. 17, 2012, now Pat. No. 9,038,946, which is a
(Continued)

(51) Int. Cl.
*B64C 11/06* (2006.01)
*B64D 11/02* (2006.01)
(Continued)

(52) U.S. Cl.
CPC ................ *B64D 11/02* (2013.01); *B64C 1/10* (2013.01); *B64D 11/06* (2013.01); *B64F 5/00* (2013.01); *Y02T 50/46* (2013.01)

(58) Field of Classification Search
CPC ............ B64D 11/00; B64D 2011/0046; B64D 11/0023; B64D 11/06; B64D 2011/0617;
(Continued)

(56) References Cited

U.S. PATENT DOCUMENTS

| 2,650,368 A | 9/1953 | Evans |
| 2,760,443 A | 8/1956 | Gobrecht |

(Continued)

FOREIGN PATENT DOCUMENTS

| EP | 1281614 A1 | 3/2005 |
| WO | WO03026495 A2 | 4/2003 |

(Continued)

OTHER PUBLICATIONS

International Search Report, Sep. 15, 2011, 8 pages.
(Continued)

*Primary Examiner* — Benjamin P Lee
(74) *Attorney, Agent, or Firm* — Gardella Grace P.A.

(57) ABSTRACT

A space efficient lavatory module for commercial aircraft includes an aft facing concave wall recess that provides a greater distance from an upper, forward facing portion of a cabin structure, such as an aircraft passenger seat to avoid having a passenger's head impact the aft facing lavatory or enclosure wall in a sudden aircraft deceleration. The aft facing concave wall recess also provides space for mounting of a protective cushion, in order to reduce a passenger's risk of head trauma in a sudden deceleration, as well as other items, such as a video monitor, a bassinet or infant bed, without inhibiting passenger movement.

12 Claims, 3 Drawing Sheets

Related U.S. Application Data continuation-in-part of application No. 13/089,063, filed on Apr. 18, 2011, now Pat. No. 8,590,838.

(60) Provisional application No. 61/346,835, filed on May 20, 2010, provisional application No. 61/326,198, filed on Apr. 20, 2010.

(51) Int. Cl.
*B64C 1/10* (2006.01)
*B64D 11/06* (2006.01)
*B64F 5/00* (2017.01)

(58) Field of Classification Search
CPC . B64D 2011/0665; B63B 11/00; B63B 11/02; B63B 29/00; B63B 29/02
USPC ............ 244/1 R, 118.5, 118.6, 129.1, 117 R; 114/116
See application file for complete search history.

(56) References Cited

U.S. PATENT DOCUMENTS

| | | | |
|---|---|---|---|
| 2,914,001 | A | 11/1959 | Murphy |
| 3,738,497 | A | 6/1973 | Betts et al. |
| 4,055,317 | A | 10/1977 | Greiss |
| 4,884,767 | A | 12/1989 | Shibata |
| 5,150,863 | A | 9/1992 | Hozumi et al. |
| 5,333,416 | A | 8/1994 | Harris et al. |
| 5,340,059 | A | 8/1994 | Kanigowski |
| 5,482,230 | A | 1/1996 | Bird et al. |
| 5,529,265 | A | 6/1996 | Sakurai |
| 5,577,358 | A | 11/1996 | Franke |
| 5,716,026 | A | 2/1998 | Pascasio et al. |
| 6,079,669 | A | 6/2000 | Hanay et al. |
| 6,615,421 | B2 | 9/2003 | Itakura |
| 6,889,936 | B1 | 5/2005 | Pho et al. |
| 7,222,820 | B2 | 5/2007 | Wentland et al. |
| 7,284,287 | B2 | 10/2007 | Cooper et al. |
| 7,448,575 | B2 | 11/2008 | Cheung et al. |
| 7,934,679 | B2 | 5/2011 | Bock et al. |
| 8,096,502 | B2 | 1/2012 | Bock et al. |
| 8,109,469 | B2 | 2/2012 | Breuer et al. |
| 8,162,258 | B2 | 4/2012 | Joannis et al. |
| 8,167,244 | B2 | 5/2012 | Johnson et al. |
| 8,177,163 | B2 | 5/2012 | Wilcynski et al. |
| 8,590,838 | B2 | 11/2013 | Cook et al. |
| D705,909 | S | 5/2014 | Koyama et al. |
| 2006/0192050 | A1 | 8/2006 | Cheung et al. |
| 2007/0164157 | A1 | 7/2007 | Park |
| 2007/0170310 | A1 | 7/2007 | Bock et al. |
| 2007/0241232 | A1 | 10/2007 | Thompson |
| 2007/0295863 | A1 | 12/2007 | Thompson |
| 2009/0050738 | A1 | 2/2009 | Breuer et al. |
| 2009/0065642 | A1 | 3/2009 | Cheung et al. |
| 2009/0146004 | A1 | 6/2009 | Plant |
| 2009/0200422 | A1 | 8/2009 | Johnson et al. |
| 2009/0255437 | A1 | 10/2009 | Hachet et al. |
| 2010/0059625 | A1 | 3/2010 | Saint-Jalmes et al. |
| 2010/0181425 | A1 | 7/2010 | Guering et al. |
| 2011/0121134 | A1 | 5/2011 | Schotte et al. |
| 2011/0139930 | A1 | 6/2011 | Sutthoff et al. |
| 2011/0210205 | A1 | 9/2011 | Bock et al. |
| 2012/0112505 | A1 | 5/2012 | Breuer et al. |
| 2012/0273614 | A1 | 11/2012 | Ehlers et al. |
| 2012/0325964 | A1 | 12/2012 | Hawkins et al. |
| 2013/0206906 | A1 | 8/2013 | Burrows et al. |
| 2014/0014774 | A1 | 1/2014 | Pozzi et al. |
| 2014/0027572 | A1 | 1/2014 | Ehlers et al. |
| 2014/0027574 | A1 | 1/2014 | Obadia et al. |

FOREIGN PATENT DOCUMENTS

| | | |
|---|---|---|
| WO | 2005014395 A1 | 2/2005 |
| WO | 2005080196 A1 | 9/2005 |
| WO | 2007006938 A1 | 1/2007 |

OTHER PUBLICATIONS

McDonnell Douglas, DC-10 Customer Configuration, Oct. 1978, 177 pages.
C&D Zodiac, Inc.'s proposal to Scandinavian Airlines System to manufacture S4 Storage Unit, Aug. 23, 2001, 17 pages.
C&D Zodiac, Inc.'s drawings with a leading page entitled "MD90," 27 pages.
Photographs of C&D Zodiac, Inc.'s S4 storage unit, 5 pages.
C&D Zodiac, Inc.'s Petition for Inter Partes Review of U.S. Pat. No. 8,590,838 (including Exhibits tabs 1-9), May 2, 2014, 856 pages.
Technical Proposal by FSI to Air France regarding a Door 4 overhead crew rest station for the Boeing 747, Aug. 3, 1994, 10 pages.
Rendering and photographs of Boeing 747 overhead crew rest station, 3 pages.
B/E Aerospace, Inc.'s Motion for Preliminary Injunction, May 16, 2014, 25 pages.
Greg Chamitoff Declaration in support of B/E Aerospace, Inc.'s Motion for Preliminary Injunction, May 14, 2014, 39 pages.
International Search Report, Jan. 27, 2015, 5 pages, from PCT/US2013/050342 published as WO 2014/014780 on Jan. 23, 2014.
R. Klaus Brauer, Affidavit Submitted in Related U.S. Appl. No. 14/709,378, signed Mar. 31, 2016, pp. 1-19 with Exhibits A-O.
R. Klaus Brauer, Affidavit Submitted in Related U.S. Appl. No. 14/709,409, signed Mar. 28, 2016, pp. 1-19.
FSI Crew Rest Rendering.†
Air France Letter.†
2007 Startup Boeing Presentation.†
Final Written Decision, Case IPR2014-00727, Paper No. 65 (PTAB Oct. 26, 2015).†
StartupBoeing, DC-10 presentation, copyright 2007.†
Letter from Flight Structures, Inc. to Air France, Aug. 3, 1994, re "B747-400M Door 4 Crew Rest", and enclosures.†
Flight Structures, Inc., 747 Door 4 Overhead Crew Rest rendering.†
Final Written Decision IPR 2014-00727, Oct. 26, 2015.†

† cited by third party

SPACE EFFICIENT LAVATORY MODULE FOR COMMERCIAL AIRCRAFT

CROSS-REFERENCES TO RELATED APPLICATIONS

This application is a divisional of application Ser. No. 13/551,397, filed Jul. 17, 2012, which is a continuation-in-part of application Ser. No. 13/089,063, filed Apr. 18, 2011, which is based upon and claims priority from Provisional Application No. 61/326,198, filed Apr. 20, 2010, and Provisional Application No. 61/346,835, filed May 20, 2010, which are incorporated by reference in their entirety herein.

BACKGROUND OF THE INVENTION

The present invention relates generally to aircraft enclosures, and more particularly relates to an aircraft cabin enclosure, such as a lavatory, an aircraft closet, or an aircraft galley, for example, including an aircraft cabin structure having an aft portion that can rapidly move in a forward direction towards an adjacent aft facing wall of an enclosure or lavatory in a sudden aircraft deceleration.

Aircraft lavatories, closets and other full height enclosures commonly have forward walls that are flat in a vertical plane. Structures such as passenger seats installed forward of such aircraft lavatories, closets and similar full height enclosures often have shapes that are contoured in the vertical plane. The juxtaposition of these flat walled enclosures and contoured structures renders significant volumes unusable to both the function of the flat walled lavatory or enclosure and the function of the contoured seat or other structure. Additionally, due to the lack of a provision for structural load sharing, conventional aircraft lavatories require a gap between the lavatory enclosures and adjacent structures, resulting in a further inefficiency in the use of space.

Aircraft bulkheads, typically separating passenger cabin areas or classes of passenger service, are in common use, and typically have a contour permitting passengers seated behind the bulkhead to extend their feet modestly under the premium seats immediately forward of the bulkhead. These provide a comfort advantage to passengers seated behind the bulkhead, but provide no increased efficiency in the use of space, in that they do not enable the seats fore and aft of the bulkhead to be placed more closely together. Short, floor-mounted stowage boxes, typically no taller than the bottom cushion of a passenger seat, are often positioned between the flat wall of current lavatories or other enclosures and passenger seats. These provide no improvement to the utility or spatial efficiency of the lavatory or other enclosure. While they do provide some useful stowage for miscellaneous items, they do not provide sufficient additional stowage to provide more space for passenger seating.

It would be desirable to provide an aircraft lavatory or other enclosure that can reduce or eliminate the gaps and volumes of space previously required between lavatory enclosures and adjacent aircraft cabin structures to allow an adjacent aircraft cabin structure such as passenger seating installed forward of the lavatory or other enclosure to be installed further aft, providing more space forward of the lavatory or enclosure for passenger seating or other features than has been possible in the prior art. Alternatively, the present invention can provide a more spacious lavatory or other enclosure with no need to move adjacent seats or other aircraft cabin structures forward.

It would also be desirable to provide an aircraft lavatory or other enclosure with a wall to bear loads from an adjacent passenger seating or other aircraft cabin structure, permitting elimination of a required gap between the lavatory or other enclosure and the adjacent passenger seating or other aircraft cabin structure, making more space available for other uses. In addition, enabling a lavatory or other enclosure to bear loads from an adjacent aircraft cabin structure can reduce the combined weight of the lavatory or other enclosure and the adjacent aircraft cabin structure.

It also would be desirable to provide an aircraft lavatory or other enclosure that can reduce or eliminate the gaps and volumes of space previously required between lavatory enclosures and adjacent aircraft cabin structures, to allow the installation of an increased number of passenger seats, to increase the value of the aircraft.

It also would be desirable to provide an aircraft lavatory or other enclosure that can provide a more efficient use of airplane cabin space and provide for greater passenger comfort by providing an aft facing concave recess in a lavatory or enclosure wall that provides a greater distance from an upper, forward facing portion of a seat back, against which a passenger's head would typically rest, to the aft facing lavatory or enclosure wall than to a flat wall extending in a vertical plane as in the prior art, to make it possible to avoid having a passenger's head impact the aft facing lavatory or enclosure wall in a sudden aircraft deceleration, and allowing the distance required between the seat and the lavatory or enclosure to be made smaller, making space available for other purposes in the airplane.

It also would be desirable to provide a volume in the aft facing concave recess in the lavatory or enclosure wall for a protective cushion, such as an airbag, for example, in order to reduce a passenger's risk of head trauma resulting from the passenger's head contacting the aft facing lavatory or enclosure wall in a sudden deceleration. It also would be desirable for the volume to provide space for a video monitor in the aft facing concave recess in the lavatory or enclosure wall that does not inhibit passenger movement, and for a bassinet or infant bed for use during flight that does not obstruct passenger movement as much as bassinets or infant beds mounted on the flat walls extending in a vertical plane of the prior art. It also would be desirable to provide a cavity or recess at floor level in the aft facing lavatory or enclosure wall to provide a volume for foot clearance for passengers. The present invention meets these and other needs.

SUMMARY OF THE INVENTION

Briefly, and in general terms, the present invention provides for an aircraft enclosure, such as a lavatory, an aircraft closet, or an aircraft galley, for example, that includes an aft facing concave wall recess that provides a greater distance from an upper, forward facing portion of a cabin structure. The cabin structure can be an aircraft passenger seat having an upper, forward facing seat back, and the greater distance between the aft facing concave wall recess avoids having a passenger's head impact the aft facing lavatory or enclosure wall in a sudden aircraft deceleration. The aft facing concave wall recess also provides space for mounting of a protective cushion, in order to reduce a passenger's risk of head trauma in a sudden deceleration, as well as other items, such as a video monitor, a bassinet or infant bed, without inhibiting passenger movement.

Accordingly, in one presently preferred aspect, the present invention provides for an enclosure, such as a lavatory, an aircraft closet, or an aircraft galley, for example, for a cabin of an aircraft including an aircraft enclosure for an aircraft cabin including a cabin structure such as a passenger seat, and having an upper aft portion and an upper, forward facing portion, such as for cushioning a passenger's head. The enclosure unit is mounted immediately forward of the aircraft cabin structure, and includes one or more walls having an aft facing wall portion that is taller than the aircraft cabin structure, and that has a surface defining a concave recess that is spaced apart from the upper, forward facing portion of the aircraft cabin structure.

In a presently preferred aspect, the cabin structure is an aircraft passenger seat that has a seat back movable from an upright position to a reclined position. In another presently preferred aspect, the concave recess includes a protective cushion. In another presently preferred aspect, the concave recess includes a video monitor. In another presently preferred aspect, the concave recess includes a bassinet. In another presently preferred aspect, the concave recess includes an infant bed. In another presently preferred aspect, the aft facing wall portion includes a recess adjacent to a floor of the aircraft cabin configured to provide foot clearance for a passenger.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
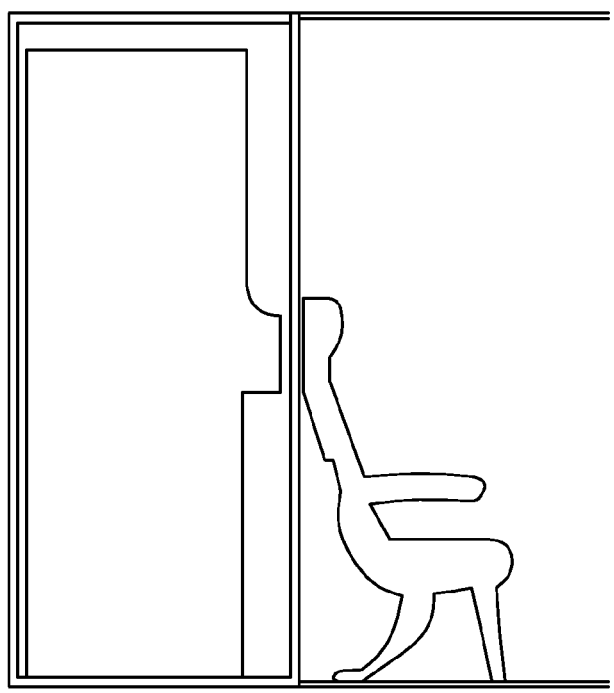
FIG. 1 is a schematic diagram of a prior art installation of a lavatory immediately aft of and adjacent to an aircraft passenger seat.
Figure 2:
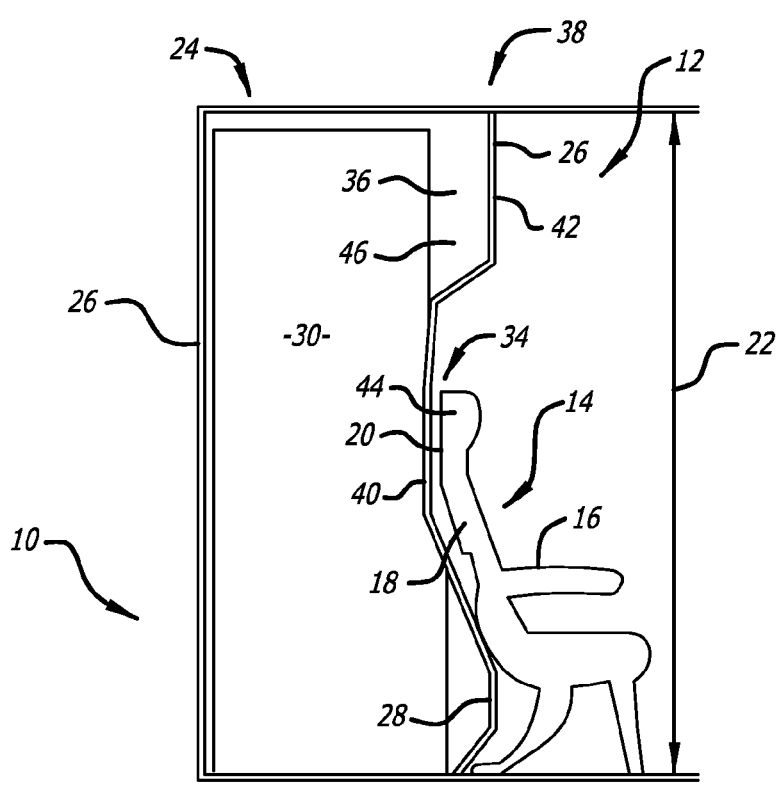
FIG. 2 is a schematic diagram of an installation of a lavatory according to a first embodiment of the present invention immediately aft of and adjacent to or abutting an aircraft cabin passenger seat.

Referring to the drawings, which are provided by way of example, and not by way of limitation, in a first embodiment illustrated in FIG. 2, the present invention provides for an enclosure 10, such as a lavatory for a cabin 12 of an aircraft (not shown), although the enclosure may also be an aircraft closet, or an aircraft galley, or another similar enclosed or structurally defined space, for example. The cabin includes an aircraft cabin structure 14, and the enclosure may be taller than the cabin structure. The cabin structure can include a passenger seat 16, for example, installed immediately forward of the enclosure and having an aft portion 18 with and exterior aft surface 20 that is substantially not flat in a vertical plane 22. The lavatory includes a lavatory stall unit 24, and having one or more walls 26 having a forward facing wall portion 28. The one or more walls define an interior lavatory space 30, and the forward facing wall portion is configured to be disposed immediately aft of and adjacent to or abutting the exterior aft surface of the aircraft cabin structure. The forward facing wall portion has a shape that is substantially not flat in the vertical plane, and preferably is shaped to include a recess 34 such that the forward facing wall portion substantially conforms to the shape of the exterior aft surface of the aircraft cabin structure, and when the aircraft cabin structure is a passenger seat, enabling the adjacent seat back 44 to move from an upright position 35, illustrated in FIG. 3, to a reclined position 37, illustrated in FIG. 4. In a presently preferred aspect, the forward facing wall portion of the lavatory stall unit is configured to accept loads from the passenger seat.

In another presently preferred aspect, the forward facing wall portion defines a secondary space 36 in the interior lavatory space in an area 38 forward of an aft-most portion 40 of the forward facing wall portion, and the forward facing wall portion includes a forward projection 42 configured to project over the aft portion of the adjacent passenger seat back 44 immediately forward of the lavatory stall unit. The secondary space can include an amenity stowage space 46 inside the lavatory stall unit in the area forward of the aft-most portion of the forward facing wall portion, and the secondary space can include design elements providing visual space, such as a visual perception of space, inside the lavatory in the area forward of an aft-most portion of the forward facing wall portion. A cavity or recess 48 may also be provided approximately at floor level in the forward facing lavatory or enclosure wall to provide a volume for attachment of a lower portion of the aircraft cabin structure, such as seat legs 47, for example, to an aircraft cabin floor 49.

Figure 3:
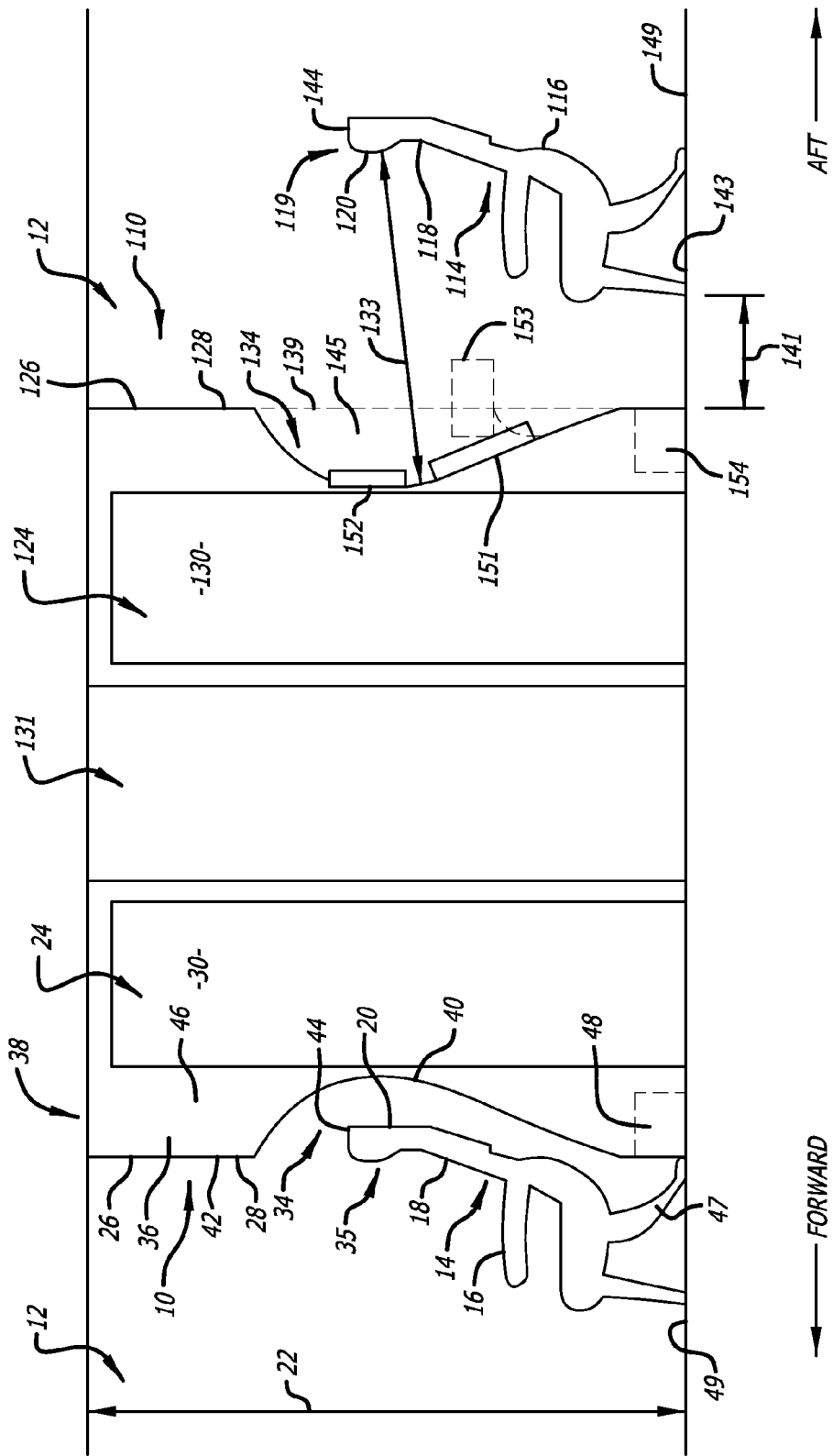
FIG. 3 is a schematic diagram of an installation of a lavatory according to a second embodiment, showing aircraft cabin passenger seat backs in an upright position.
Figure 4:
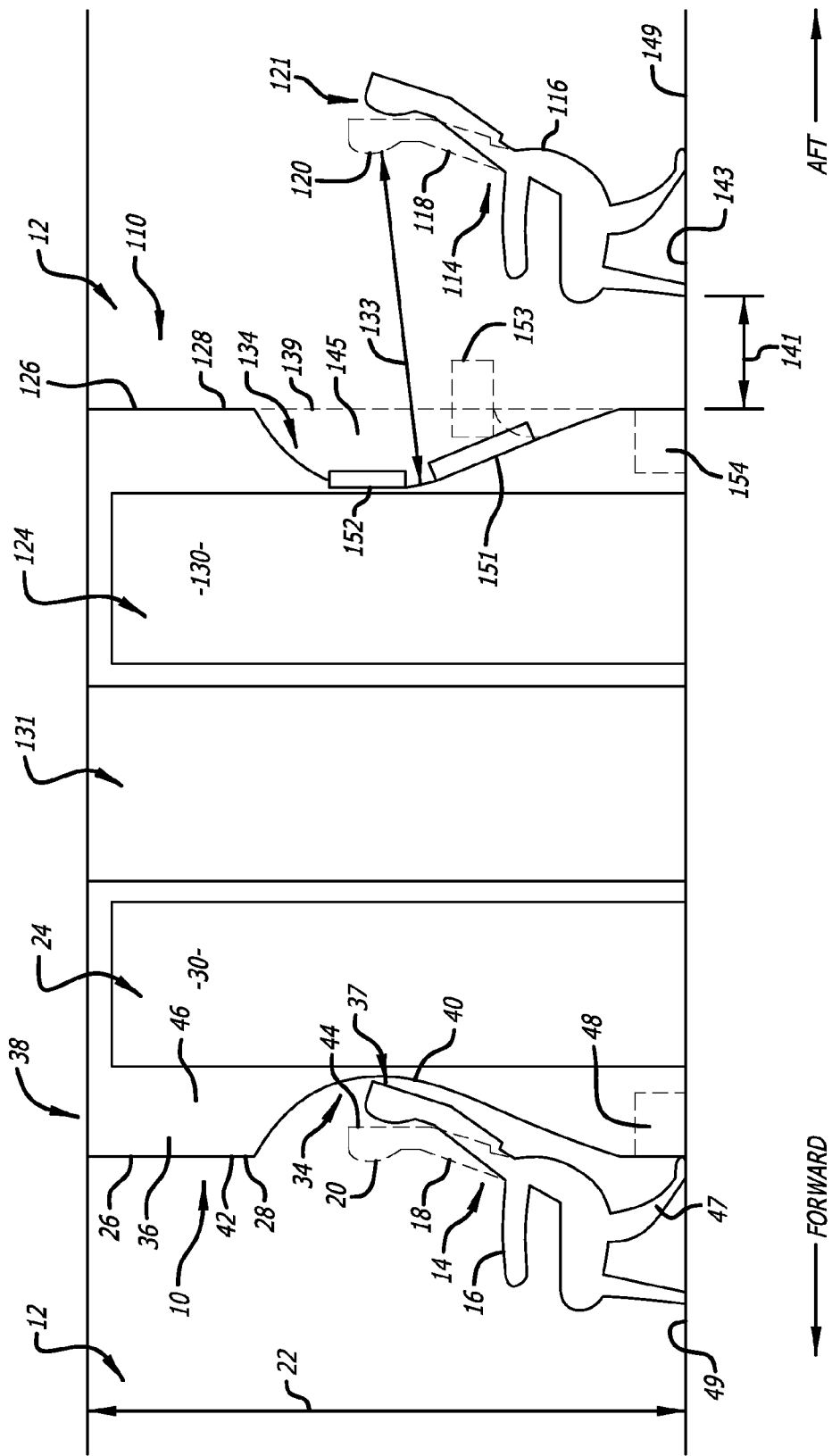
FIG. 4 is a schematic diagram of the installation of a lavatory according to a second embodiment similar to FIG. 3, showing aircraft cabin passenger seat backs in a reclined position.

Referring to FIGS. 3 and 4, in a second embodiment, the present invention also provides for an enclosure 110, such as a lavatory, for example, in a cabin 12 of an aircraft, although the enclosure may also be an aircraft closet, or an aircraft galley, or another similar enclosed or structurally defined space, for example. The cabin includes an aircraft cabin structure 114, such as a passenger seat 116, for example, installed immediately aft of the enclosure and having an upper aft portion 118, such as a seat back 144, for example, movable from an upright position 119, illustrated in FIG. 3, to a reclined position 121, illustrated in FIG. 4. The upper aft portion of the passenger seat typically includes an upper, forward facing portion 120, against which a passenger's head would typically rest.

The lavatory includes a lavatory stall unit 124 and is enclosed by one or more walls 126 having an aft facing wall portion 128. The one or more walls define an interior lavatory space 130, and the aft facing wall portion is configured to be disposed forward of and adjacent to the aircraft cabin structure, such as a passenger seat, as would typically occur aft of an aircraft doorway or cross aisle 131. The enclosure is typically taller than the cabin structure or passenger seat, and the aft facing wall portion preferably is shaped to include a concave recess 134, so that the aft facing wall portion is substantially not flat in the vertical plane, and the concave recess is preferably spaced apart a distance 133 from the upper, forward facing portion of the aircraft cabin structure, where a passenger's head would typically rest, to the aft facing wall portion of the lavatory or enclosure, sufficient to avoid having a passenger's head impact the aft facing lavatory or enclosure wall in a sudden aircraft deceleration, and this distance is preferably a greater distance from the upper, forward facing portion of the aircraft cabin structure to the aft facing lavatory or enclosure wall than with a flat wall 139 (shown in dotted lines in FIGS. 3 and 4) of the prior art. As a consequence, a distance 141 that is commonly required between a base 143 of the aircraft cabin structure or passenger seat and the lavatory or enclosure can be made smaller, making space available for other purposes in the airplane.

In another presently preferred aspect, the volume 145 in the aft facing concave recess in the aft facing wall portion is sufficient for the mounting of a protective or "delethalizing" cushion 151, such as an airbag, or an energy absorbing cushion, for example, to the aft facing concave recess in the aft facing wall portion, in order to reduce a passenger's risk of head trauma resulting from the passenger's head contacting the aft facing lavatory or enclosure wall in a sudden deceleration of the aircraft. The volume in the aft facing concave recess in the aft facing wall portion is also preferably sufficient for the mounting of a video monitor 152 in the aft facing concave recess in the lavatory or enclosure wall that does not inhibit passenger movement, as well as for the mounting of a bassinet or infant bed 153 that does not obstruct passenger movement as much as bassinets or infant beds mounted on the flat walls for use during flight and extending in a vertical plane of the prior art. In addition, at floor level or adjacent to the cabin floor 149, the aft facing wall portion may also include one or more cavities 154 configured to provide supplemental foot clearance for passengers.

It will be apparent from the foregoing that while particular forms of the invention have been illustrated and described, various modifications can be made without departing from the spirit and scope of the invention. Accordingly, it is not intended that the invention be limited, except as by the appended claims.

We claim:

1. An aircraft enclosure for a cabin of an aircraft, the cabin including a passenger seat located forward of and proximate to the aircraft enclosure, said passenger seat having a seat back with an exterior aft surface that is substantially not flat, a seat bottom, and a seat support that interfaces with the floor of the aircraft cabin and holds the seat bottom in an elevated position above the floor of the aircraft cabin, the aircraft enclosure comprising:
   an enclosure unit having a forward wall, said forward wall being part of an outer boundary defining a single enclosed space that includes a toilet, said forward wall being substantially not flat and configured to receive a portion of the exterior aft surface of said seat back;
   wherein said forward wall is adapted to provide additional space forward of the enclosure unit for said seat support to be positioned further aft in the cabin when compared with a position of said seat support if said forward wall was instead substantially flat; and
   wherein said single enclosed space is taller than said passenger seat.

2. The apparatus of claim 1, wherein said single enclosed space includes one or more secondary storage spaces.

3. The apparatus of claim 1, wherein the portion of the exterior aft surface of said seat back received by the forward wall is substantially more than a headrest portion of the exterior aft surface of the seat back.

4. The apparatus of claim 1, wherein the portion of the exterior aft surface of said seat back received by the forward wall is more than an upper half of the exterior aft surface of the seat back.

5. The apparatus of claim 1, wherein said forward wall is also configured to receive at least an aft-extending portion of the seat support of said passenger seat.

6. The aircraft enclosure of claim 1, wherein said forward wall is shaped to substantially conform to a contoured shape of the exterior aft surface of the seat back.

7. The aircraft enclosure of claim 6, wherein said contoured shape includes a first section extending along a first axis and a second section extending along a second axis, said first section adapted to support a passenger's head and said second section adapted to support a passenger's back, wherein said first axis is not parallel with said second axis.

8. A combination of an aircraft enclosure unit and an aircraft passenger seat for installation in an aircraft cabin, the combination comprising:
   said passenger seat configured to be located forward of and proximate to the aircraft enclosure unit, said passenger seat having a seat back with an exterior aft surface that is substantially not flat, a seat bottom, and a seat support that interfaces with the floor of the aircraft cabin and holds the seat bottom in an elevated position above the floor of the aircraft cabin;
   the aircraft enclosure unit having a forward wall, said forward wall being part of an outer boundary defining a single enclosed space that includes a toilet, said forward wall being substantially not flat and configured to receive a portion of the exterior aft surface of said seat back;
   wherein said forward wall is adapted to provide additional space forward of the aircraft enclosure unit for said seat support to be positioned further aft in the cabin when compared with a position of said seat support if said forward wall was substantially flat; and
   wherein said single enclosed space is taller than said passenger seat.

9. The apparatus of claim 8, wherein said single enclosed space includes one or more secondary storage spaces within said boundary defining said single enclosed space.

10. The apparatus of claim 8, wherein said forward wall is also configured to receive at least an aft-extending portion of the seat support of said passenger seat.

11. The apparatus of claim 8, wherein said exterior aft surface of the seat back has a contoured shape, and said forward wall is shaped to substantially conform to the contoured shape of the exterior aft surface of the seat back.

12. The apparatus of claim 11, wherein said contoured shape includes a first section extending along a first axis and a second section extending along a second axis, said first section adapted to support a passenger's head and said second section adapted to support a passenger's back, wherein said first axis is not parallel with said second axis.

* * * * *